Patented Dec. 27, 1949

2,492,554

UNITED STATES PATENT OFFICE 2,492,554

PROCESS FOR PREPARING BETA-PHTHAL-IMIDO PROPANE DERIVATIVES

Saul Chodroff, Brooklyn, N. Y., and Roland Kapp, Newark, and Charles O. Beckmann, Leonia, N. J., assignors to Nopco Chemical Company, Harrison, N. J., a corporation of New Jersey No Drawing. Application July 25, 1946, Serial No. 686,160

12 Claims. (Cl. 260—326)

1

The present invention relates to the preparation of beta-phthalimido propane derivatives, especially in connection with the production of beta-alanine (beta-amino propionic acid).

Beta-alanine is an important intermediate in the preparation of pantothenic acid and an improved process of synthesizing beta-alanine has long been desired in view of the complex procedure and comparatively low yield of many of the present methods. Much recent investigation has been devoted to this subject using acrylonitrile as a starting material and either ammonia or phthalimide. When acrylonitrile is reacted with an excess of concentrated ammonium hydroxide, the yield of the desired beta-aminopropionitrile ranges between 20 and 30% depending on the reaction conditions, and remaining acrylonitrile is converted to the secondary amine, $\beta,\beta'$ dicyanodiethyl amine. This secondary amine can be hydrolyzed to beta-alanine in about 35% yield at high temperature and pressure in an autoclave by reaction with aqueous ammonia as set forth in U. S. Patent 2,334,163.

An object of the present invention is to provide an improved method for the preparation of beta-phthalimido propane derivatives.

A second object of the invention is to provide an improved method of preparing beta-alanine.

A third object of the invention is to provide an improved method of preparing beta-phthalimido propane derivatives from imino-dipropane derivatives.

A fourth object of the invention is to provide an improved method of preparing beta-alanine from imino-di-3-propionitrile.

Other objects of the invention will in part be obvious and will in part appear hereinafter.

In accordance with the present invention, it has been discovered that certain imino-dipropane derivatives react with phthalic acid or its anhydride to produce beta-phthalimido propane derivatives. Upon subsequent hydrolysis of the latter compound with a suitable reagent, beta-alanine is formed.

The invention accordingly comprises one or more novel steps and the relation of one or more of such steps with respect to each of the others thereof, which will be exemplified in the following detailed disclosure, and the scope of the invention will be indicated in the claims.

The basic reaction of the present invention comprises the fusion of either phthalic anhydride or phthalic acid with secondary amines of the type NH(CH₂CH₂Y)₂ where Y represents CN, COOH

2 or COOR, and R represents an alkyl group. The product is either beta-phthalimido propionic acid or an alkyl beta-phthalimido propionate. The reaction may be expressed by the equation below, and the use of stoichiometric proportions of reactants is recommended.

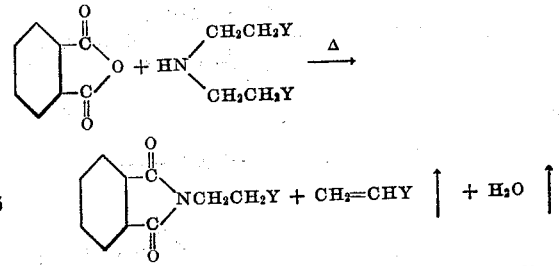

Formation of a phthalimido compound was a distinct surprise in view of the teaching of Kamm that the reaction of secondary amines with phthalic anhydride produces amides rather than imides even upon heating; pages 69 and 70, "Qualitative Organic Analysis," 2nd edition, by Oliver Kamm, John Wiley and Son, Inc., New York, 1932. During the fusion treatment, water vapor and an acrylic compound of the group consisting of acrylic acid, acrylonitrile and alkyl acrylates are driven off. The transformation occurring when phthalic acid is used in place of the anhydride is similar, except that an additional mole of water is formed.

In order to avoid undesirable by-products and obtain satisfactory yields in the fusion reaction, it is necessary that the acrylic compounds formed be removed from the field of reaction. Accordingly, suitable esters of imino-di-3-propionic acid include only those which form alkyl acrylates possessing substantial vapor pressures below 200° C. Inasmuch as imino-di-3-propionitrile has hitherto been an unwanted by-product of various processes involving the reaction of acrylonitrile with ammonia, the present process providing, as it does, a relatively simple method for the production of beta-alanine and utilizing a compound of the character of imino-di-3-propionitrile represents a considerable advance in the art. Where imino-di-3-propionic acid is desired as a reactant, it may be obtained by hydrolysis of imino-di-3-propionitrile. When an ester such as diethyl imino-di-3-propionate is employed, it can be prepared in 40 per cent yield by reacting imino-di-3-propionic acid with absolute ethanol containing 4% dry HCl, in the manner described by Kuettel and McElvain in the Journal of the American Chemical Society, volume 53 (1931), pages 2692-6.

After fusion of the reaction mass at temperatures of approximately 180 to 200° C. for a period of time of the order of one-half hour, the fused mass is cooled and precipitated in water and purified by recrystallizing from a suitable solvent, such as aqueous alcohol or benzene, to yield the phthalimido derivative. In utilizing phthalic acid, heating of the reactants should be controlled in order to produce a gradual temperature rise from 150 to about 200° C., for an abrupt temperature increase within these limits is undesirable. The phthalimido compound is then hydrolyzed by refluxing with a mineral acid, such as sulfuric acid, to yield the acid salt of beta-alanine. Phthalic acid precipitates during this step and is removed by filtration when the mixture is cool. The reaction under discussion takes the course indicated by the appropriate one of the three following equations.

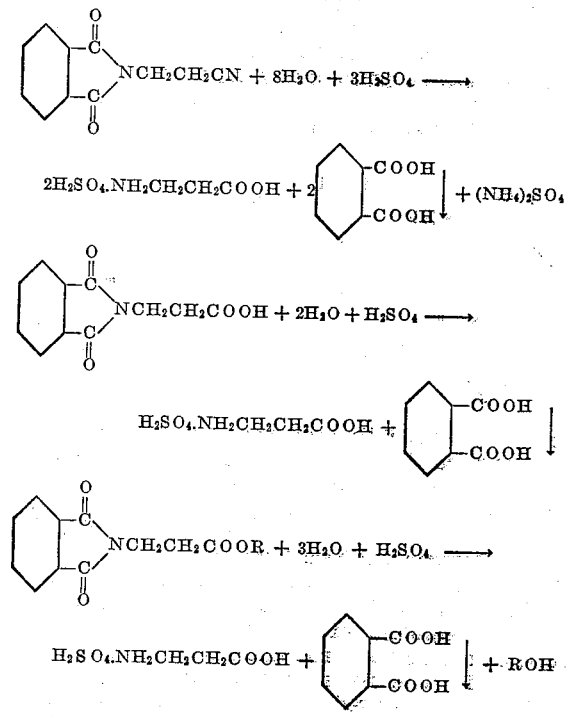

The hydrolysis of the beta-phthalimido propane derivatives can also be carried out in the manner indicated by Gabriel in Berichte 23, page 1772 or Berichte 38, page 634 (1905).

Thereafter the acid compound in the filtrate is neutralized with barium hydroxide to precipitate barium sulfate which is removed by filtration and to release the beta-alanine from its acid salt. The aqueous filtrate is now concentrated into a very small volume and beta-alanine precipitated by the addition of methanol, isopropanol or other suitable alcohol. Although sulfuric acid is the preferred reagent in the hydrolysis step, other mineral acids may be employed, as for instance hydrochloric acid, in which case the acid is removed by precipitation with silver oxide, or by the use of an ion exchanger, or by treatment with lithium hydroxide. When lithium hydroxide is used, lithium chloride remains in the filtrate and is separated from the beta-alanine only by precipitation of the latter. Yields of beta-alanine upwards of 65% have resulted from carrying out the present process.

The recrystallization of the beta-phthalimido propane derivatives formed in the fusion reaction is necessary only to obtain sufficient purity for purposes of identification in experimental work. In commercial manufacture of beta-alanine, elimination of the recrystallization step will improve yields due to elimination of the unavoidable losses of material during recrystallization. The hydrolysis may then be performed on the crude reaction product which is precipitated after fusion by pouring into water.

For a fuller understanding of the nature and objects of the invention, reference should be had to the following examples which are given merely to further illustrate the invention and are not to be construed in a limiting sense, all proportions being given in terms of weight.

Example I 212 parts by weight of imino-di-3-propionic acid ($\beta,\beta'$ imino bis propionic acid) of melting point 148-9° C. were fused with 195 parts of phthalic anhydride at 180 to 200° C. for one-half hour. Water and acrylic acid were evolved during the reaction. After cooling, the fused mass was recrystallized from 1000 parts of aqueous methanol (60% methanol) for positive identification, and yielded 211 parts (73% of theory) of beta-phthalimido propionic acid (phthalyl beta-alanine) having a melting point of 147-148° C. The crystalline mass was then hydrolyzed with a large excess of acid by refluxing for 3 hours with 652 parts of concentrated sulfuric acid (98% $H_2SO_4$) and 600 parts of water. A precipitate of phthalic acid appeared within one hour after the refluxing began. The solution was cooled after 3 hours, and the phthalic acid filtered off. The yield of phthalic acid from the beta-phthalimido propionic acid was substantially quantitative. By the addition of 1700 parts of $Ba(OH)_2.8H_2O$ in 5000 parts of water, the filtrate was freed of sulfuric acid. The precipitated barium sulfate was then removed by filtering, and the aqueous filtrate was concentrated to a very small volume by evaporation. To precipitate beta-alanine, methanol was added to the concentrated filtrate. Upon filtration and drying, 75 parts of beta-alanine (melting point 196-197° C.) were obtained; this was equivalent to a yield of 63% of theory.

Example II 12.3 parts by weight of imino-di-3-propionitrile ($\beta, \beta'$ dicyanodiethyl amine) having a boiling point of 168-170° C./3 mm. were heated for 45 minutes with 14.8 parts of phthalic anhydride in a reaction vessel set in an oil bath maintained at 200° C. The mass became molten at 175-180° C., and a rapid evolution of bubbles appeared in the liquid when the temperature reached 200° C. Water and acrylonitrile distilled off; and as the reaction slowed down, the last traces of these substances were removed under a moderate vacuum of about 100 mm. The hot melt was carefully poured with vigorous stirring into 150 parts of cold water. A pale yellow solid precipitated, and was separated from the water by filtration. For identification, the precipitate was then purified by recrystallizing from aqueous methanol. The yield was 15.0 parts of beta-phthalimido propionitrile (melting point 150-151° C.) or 75% theory. This product was hydrolyzed by heating with 15 parts of concentrated sulfuric acid (96% $H_2SO_4$) on a steam bath for 10 minutes to convert the nitrile to the amide. The acid solution was then cooled and 30 parts of water added, after which it was refluxed. The solid dissolved in about 1 hour and then phthalic acid began to precipitate. Refluxing was continued for an additional 2 hours. The liquid was chilled, filtered free of phthalic acid and the filtrate diluted to 400 parts with water. By the addition of an equivalent amount of barium hydroxide, the sulfate ion was removed by precipitation as barium sulfate. The barium sulfate was filtered, washed with water and the filtrate and washings concentrated to a syrup by distillation under vacuum. When the syrupy residue was triturated with methanol, a white precipitate of beta-alanine was deposited. This precipitate was filtered, washed with cold methanol and dried at 60° C. The yield amounted to 69% based on the original reactants, or 6.15 parts of beta-alanine.

*Example III*

108.5 parts by weight of diethyl imino-di-3-propionate ($\beta$, $\beta'$ dicarbethoxydiethyl amine), having a boiling point of 137–139° C./12 mm., were fused with 74.0 parts of phthalic anhydride at 200° C. for a half hour. The warm fusion product was poured into 2500 parts of cold water, and the oil congealed on chilling over-night. The crude material was filtered off, and then recrystallized from ethanol, the yield of purified crystals amounting to 88.8 parts, or 72%. The recrystallized substance had a melting point of 65–66° C., and analysis indicated it was the ethyl ester of beta-phthalimido propionic acid. This was verified by preparing another sample of the ester by a different method, mixing the two samples and finding no depression of the melting point of the mixture in comparison with that of the recrystallized fusion product. The ethyl beta-phthalimido propionate thus prepared was hydrolyzed to beta-alanine in the same manner as that set forth in Example I.

*Example IV*

32.2 parts by weight of imino-di-3-propionic acid were fused with 29.6 parts of phthalic anhydride for one-half hour at 200° C. under 200 mm. vacuum to facilitate removal of the volatile products. The fusion product was precipitated in water and filtered in the manner set forth in Example II. The resulting beta-phthalimido propionic acid was recrystallized in an aqueous solution containing 40% methanol. 37.3 parts of the purified crystals (melting point 151° C.) were obtained; this quantity is equivalent to 85% of the theoretical yield. The product was suitable for hydrolyzing to beta-alanine as indicated in Examples I and II.

*Example V*

9.53 parts by weight of the diisopropyl ester of imino-di-3-propionic acid (boiling point 68–72° C./3 mm.) were fused with 5.70 parts of phthalic anhydride at 200° C. for 30 minutes. After cooling to about 100° C., the molten mass was poured into 400 parts of water with stirring. An oil congealed which was filtered and then recrystallized from a mixture of 28 parts of methanol and 15 parts of water. The yield was 8.20 parts of a substance in the form of white plates. Further recrystallization of a sample did not change the melting point from 65–66° C. An authentic sample of isopropyl beta-phthalimido propionate, prepared by esterifying beta-phthalimido propionic acid with isopropanol, melted at 66.5 to 67.5° C. When the authentic sample was mixed with the sample obtained by the fusion process, it did not depress the melting point of the latter; thus proving that recrystallized fusion product was the isopropyl ester of beta-phthalimido propionic acid. The yield of 8.2 parts corresponded to 82% of theory. This ester was a suitable raw material for hydrolysis to beta-alanine in the manner described in Examples I and II.

*Example VI*

166 parts by weight of crude phthalic acid and 123 parts of crude imino-di-3-propionitrile were heated rapidly to 150° C.; thereafter the heating was carefully controlled so that the temperature rose slowly and gradually to 200° C. After fusing for one hour at the latter temperature, the reaction mixture was poured into 1500 grams of water with stirring. Beta-phthalimido propionitrile precipitated, and was separated from the water by filtration. This substance was then refluxed for 3 hours in 1500 parts of 30% $H_2SO_4$ to hydrolyze it to phthalic acid and the sulfuric acid salt of beta-alanine. The phthalic acid precipitate was filtered off, and the sulfate ion removed by precipitation as $BaSO_4$ upon addition of 1700 parts of $Ba(OH)_2.8H_2O$ in 5000 parts of water and subsequent filtration. After evaporating the filtrate to a syrup, methanol was poured in to precipitate beta-alanine in a quantity of 39 parts, or 44% of the theoretical yield.

Since certain changes may be made in carrying out the above method without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described our invention, what we claim as new and desire to secure by Letters Patent is:

1. A method comprising reacting a dicarboxylic benzene derivative selected from the group consisting of phthalic anhydride and phthalic acid with a compound of the class

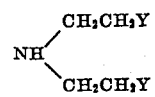

to form a beta-phthalimido propane derivative having the formula

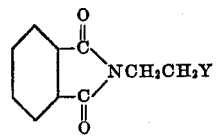

where Y is selected from the group consisting of CN, COOH and COOR, and R represents an alkyl group capable of forming an acrylic acid ester that is volatile below 200 degrees centigrade at atmospheric pressure.

2. A method comprising reacting phthalic anhydride with a compound of the class

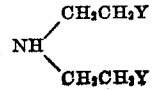

to form a beta-phthalimido propane derivative having the formula

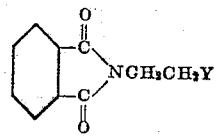

where Y is selected from the group consisting of CN, COOH and COOR, and R represents an alkyl group capable of forming an acrylic acid ester that is volatile below 200 degrees centigrade at atmospheric pressure.

3. A method comprising reacting phthalic acid with a compound of the class

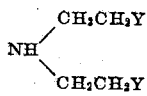

to form a beta-phthalimido propane derivative having the formula

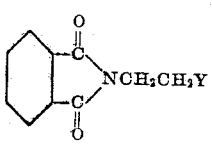

where Y is selected from the group consisting of CN, COOH and COOR, and R represents an alkyl group capable of forming an acrylic acid ester that is volatile below 200 degrees centigrade at atmospheric pressure.

4. A method comprising reacting a dicarboxylic benzene derivative, selected from the group consisting of phthalic anhydride and phthalic acid, with imino-di-3-propionitrile to form beta-phthalimido propionitrile.

5. A method comprising reacting a dicarboxylic benzene derivative, selected from the group consisting of phthalic anhydride and phthalic acid, with imino-di-3-propionic acid to form beta-phthalimido propionic acid.

6. A method comprising reacting phthalic anhydride with imino-di-3-propionitrile to form beta-phthalimido propionitrile.

7. A method comprising reacting phthalic acid with imino-di-3-propionitrile to form beta-phthalimido propionitrile.

8. A method comprising reacting phthalic anhydride with imino-di-3-propionic acid to form beta-phthalimido propionic acid.

9. The method of claim 1 in which the reactants are fused at about 180 to 200 degrees centigrade.

10. The method of claim 2 in which the reactants are fused at about 180 to 200 degrees centigrade.

11. The method of claim 3 in which the reactants are fused at about 180 to 200 degrees centigrade.

12. The method of claim 4 in which the reactants are fused at about 180 to 200 degrees centigrade.

SAUL CHODROFF.
ROLAND KAPP.
CHARLES O. BECKMANN.

REFERENCES CITED

The following references are of record in the file of this patent:

UNITED STATES PATENTS

| Number | Name | Date |
| --- | --- | --- |
| 2,401,429 | Kung | June 4, 1946 |

FOREIGN PATENTS

| Number | Country | Date |
| --- | --- | --- |
| 119,712 | Australia | Mar. 29, 1945 |

OTHER REFERENCES

Sedgwick: "Organic Chemistry of Nitrogen," Clarendon Press, Oxford (1937), pp. 114–115.

Galat: J. Am. Chem. Soc. (Aug. 1945), vol. 67, pp. 1414–1415.